United States Patent [19]  
Ishiguro et al.

[11] Patent Number: 4,835,049
[45] Date of Patent: May 30, 1989

[54] MAGNETIC RECORDING MEDIUM

[75] Inventors: Shu Ishiguro; Ryosuke Isobe, both of Hino, Japan

[73] Assignee: Konica Corporation, Tokyo, Japan

[21] Appl. No.: 139,297

[22] Filed: Dec. 29, 1987

[30] Foreign Application Priority Data

Dec. 30, 1986 [JP] Japan .................. 61-315168

[51] Int. Cl.$^4$ ............... G11B 5/708; G11B 5/706
[52] U.S. Cl. .................. 428/323; 428/329; 428/694; 428/900
[58] Field of Search ........... 428/694, 329, 900, 323

[56] References Cited

U.S. PATENT DOCUMENTS

| 4,132,827 | 1/1979 | Mukaida | 428/329 |
| 4,135,016 | 1/1979 | Ogawa | 428/329 |
| 4,407,901 | 10/1983 | Miyatsuka | 428/900 |
| 4,537,833 | 8/1985 | Kasuga | 428/695 |
| 4,551,386 | 11/1985 | Yamaguchi | 428/323 |
| 4,555,431 | 11/1985 | Miyatsuka | 428/900 |

Primary Examiner—Paul J. Thibodeau
Attorney, Agent, or Firm—Jordan B. Bierman

[57] ABSTRACT

The invention relate to a magnetic recording medium which comprises a magnetic layer on a support. The magnetic layer contains an iron-aluminum alloy magnetic powder and a carbon black having a BET specific surface area of from 15 to 80 m²/g and a DBP oil absorption of the carbon black from 110 to 200 ml/100 g.

11 Claims, 5 Drawing Sheets

FIG. 4

| Sample No. | Saturated Magnetization Bm (GAUSS) | Saturated Magnetization After Aging Bm' (GAUSS) | Saturated Magnetization Residual Rate (%) Bm'/Bm | Square Ratio | Gloss (%) | Still Mode Endurance | Calender Stain | D.O. (5μs) | Durability RF Output (dB) | Durability Shedding | Lack of PCM Voice | RF Output (dB) | Lumi S/N (dB) | Chroma S/N (dB) | μk |
|---|---|---|---|---|---|---|---|---|---|---|---|---|---|---|---|
| SAMPLE 1 | 3150 | 2850 | 88 | 0.82 | 112 | OVER 120min. | A | 33 | -0.6 | A | 0 | +0.5 | +0.5 | +0.3 | 0.24 |
| " 2 | 2950 | 2750 | 93 | 0.83 | 116 | " | A | 36 | -0.5 | A | " | +0.3 | +0.2 | +0.2 | 0.23 |
| " 3 | 2850 | " | 96 | 0.84 | 118 | " | A | 34 | -0.3 | A | " | 0.0 | 0.0 | 0.0 | 0.21 |
| " 4 | 2700 | 2650 | 98 | 0.86 | 121 | " | A | " | -0.1 | A | " | -0.2 | -0.2 | -0.1 | 0.20 |
| " 5 | 2200 | 2180 | 99 | 0.88 | 125 | " | A | 35 | " | A | " | -1.0 | -0.9 | -0.6 | 0.19 |
| " 6 | 2850 | 2750 | 96 | 0.84 | 116 | " | A | " | -0.3 | A | " | -0.1 | 0.0 | 0.0 | 0.21 |
| COMPARATIVE SAMPLE 1 | 3200 | 2100 | 66 | 0.78 | 90 | 15min. | A | 32 | CLOG ON HEAD | C | " | +0.6 | +0.6 | +0.5 | 0.26 |
| " 2 | 1900 | 1880 | 99 | 0.84 | 123 | OVER 120min. | B | 72 | -0.1 | A | " | -2.0 | -2.0 | -1.6 | 0.18 |
| " 3 | 2850 | 2750 | 96 | 0.86 | 120 | " | C | 168 | CLOG ON HEAD | C | OVER 30 LACKS | +0.6 | +0.6 | +0.5 | 0.38 |
| " 4 | " | " | " | 0.84 | 118 | " | B | 74 | -0.4 | A | 0 | +0.5 | +0.4 | " | 0.25 |
| " 5 | " | " | " | " | " | " | A | 35 | " | C | " | 0.0 | -0.1 | 0.0 | 0.35 |
| " 6 | " | " | " | " | 116 | " | A | 33 | -3.2 | B | " | " | 0.0 | -0.2 | 0.31 |
| " 7 | " | " | " | 0.82 | 112 | " | A | 78 | -0.2 | A | " | -3.2 | -3.0 | -2.8 | 0.23 |
| " 8 | " | " | " | 0.84 | 116 | " | A | 85 | -2.8 | B | " | +0.1 | +0.1 | 0.0 | 0.35 |

NOTE: " UNABLE TO BE MEASURED BECAUSE OF THE TROUBLE IN TAPE RUNNING

MAGNETIC RECORDING MEDIUM

FIELD OF THE INVENTION

The present invention relates to a magnetic recording media such as a magnetic tape, magnetic sheet, magnetic disc, and the like.

BACKGROUND OF THE INVENTION

Generally speaking, a magnetic recording medium such as a magnetic tape is prepared by coating a magnetic coating liquid containing a magnetic powder, a binder resin, and the like on a support and then drying.

In such a magnetic recording medium, particularly in video tape, carbon black is used with the magnetic powder in order to satisfy simultaneously some of requirements such as conductivity, coefficient of friction, surface characteristic (i.e., electromagnetic conversion property), wear resistance, etc. As techniques of this kind, there are conventionally known those disclosed in Japanese Patent Publication Open to Public Inspection (hereinafter referred to as O.P.I.) Nos. 5426/1984, 16141/1984, 218039/1983 and 211321/1983, Japanese Patent Examined Publication Nos. 20203/1978, 9041/1979 and 4968/1982.

Also, O.P.I. No. 144727/1986 discloses a magnetic recording medium having a magnetic layer containing a ferromagnetic alloy powder, wherein the magnetic layer also contains a fatty acid having a melting point of less than 50° C., a fatty acid and a fatty acid ester having a melting point of not less than 50° C., and a carbon black having an average particle size of from 60 to 120 nm and a DBP oil absorption of not more than 100 ml/100 g.

In a conventional magnetic recording medium, however, the ferromagnetic alloy powder used in combination with the carbon black had been limited with respect to its surface area but not restricted with respect to its composition. However, in recent years, uses of video tape have been diversified as portable-type video recorder-player units come into common use, so that the video tape is being used under a wide variety of conditions. Accordingly, the video tape is required to be highly corrosion-resistant. Among the ferromagnetic alloys whose corrosion resistance would be expected to fall into the desired range, iron-aluminum-type ferromagnetic alloys suitable corrosion resistance. Moreover, iron-aluminum ferromagnetic alloys, unlike ferromagnetic alloys in general, have good dispersability.

In conventional magnetic recording mediums, the addition of an iron oxide-type magnetic powder and carbon black to a magnetic layer is known, but the optimum conditions for the use in the magnetic layer of the ferromagnetic alloy metal powder in combination with carbon black has been an object of research and development.

SUMMARY OF THE INVENTION

It is an object of the present invention to provide a magnetic recording medium capable of high-density video recording, having an excellent dispersibility as well as corrosion resistance, a small coefficient of friction and improved running endurance.

It is also an object of this invention to provide such a recording medium wherein calender treatment stain is prevented and a drop-out phenomenon that could be resulted from the calender treatment stain is prevented. Clogging of the head of the recorder-player and the surface resistivity without deterioration of its electromagnetic conversion property.

The present invention is directed to a magnetic recording medium having a magnetic layer comprising an iron-aluminum magnetic powder wherein the aluminum content is from 0.5% by weight to 20% by weight and carbon black having a BET specific surface area of from 15 $m^3/g$ to 80 $m^3/g$ and a DBP oil absorption of from 110 ml/100 g to 200 ml/100 g.

BRIEF DESCRIPTION OF THE DRAWINGS

The accompanying drawings show examples of the present invention.

FIG. 4 is a table showing the characteristics of all the tapes in the examples.

DETAILED DESCRIPTION OF THE INVENTION

Figure 1:
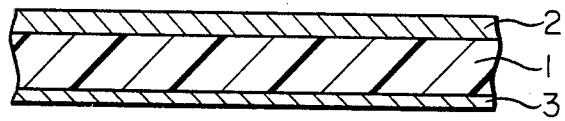
FIGS. 1, 2 and 3 are partially enlarged sectional views of magnetic recording media according to this invention.

Because the magnetic powder of this invention is of the iron-aluminum ferromagnetic metal powder wherein the Al content is from 0.5% by weight to 20% by weight based on the Fe, the magnetic recording medium of the invention exhibits high corrosion resistance and good dispersibility. This magnetic powder, for example, is disclosed in O.P.I. No. 207,024/1984. This fact implies that the magnetic powder, even as its specific surface area is increased, can have adequate dispersibility as, and, therefore is very useful for a high-density video recording medium. Moreover, in this instance, it is of vital importance that the Al content of the magnetic powder is restricted to the specific range of 0.5 to 20%. If the Al content is less than 0.5%, the magnetic powder becomes significantly inferior in corrosion resistance as well as: dispersibility. If the content exceeds 20%, the proportion of Al is too high and the electromagnetic conversion deteriorates. The Al content should be within the above-mentioned range, and preferably in the range of from 1 to 8%. However, in addition to the above Al content, the magnetic powder may also contain other non-aluminum constituents.

In this specification, the term '% by weight' of aluminum in the magnetic powder of the present invention which means the percentage by weight of Al as metal based on the total amount of Fe as metal. Accordingly, for example, if the Al content is 1% by weight, there is one Al atom for each 100 atoms of Fe.

In the present invention, it is preferable that the magnetic powders have a BET specific surface area of not less than 40 $m^3/g$ and, as a result, it can be densely packed in the magnetic layer.

When the BET value and DEP oil absorption of the carbon black in the magnetic layer are restricted to the above specific ranges, the magnetic layer is so improved that high electromagnetic conversion properties such as luminance S/N (hereinafter referred to as lumi S/N), chrominance S/N (hereinafter referred to as chroma S/N), etc., can be attained, specific surface resistivity is lowered, drop-out is reduced, the coefficient of friction is lowered, running endurance is excellent, the output scarcely falls even if running under conditions of high-temperature and high-humidity, and the calendering stain on the layer, as well as the clogging of the head are also reduced. The BET value of the carbon black of the present invention is 15 m$^3$/g to 80 m$^2$/g, preferably 20 to 50 m$^2$/g, whereby it reduces the coefficient of friction of the magnetic layer and also improves the light-imperviousness thereof. Moreover, the carbon black, since it has a DBP oil absorption of not less than 110 ml/100 g, is relatively likely to form a structural construction, and therefore can exhibit a high conductivity and the low coefficient of friction; further, since its DBP oil absorption range is from 110 to 200 ml/100 g, its dispersibility is also satisfactory. The DBP oil absorption of the carbon black should preferably be 110 to 200 ml/100 g, and more preferably 160 to 200 ml/100 g.

In the present invention, the amount of carbon black added to obtain the above-mentioned effect should preferably be from 0.1 part to 10 parts per 100 parts by weight of the magnetic powder and, more preferably, from 0.5 part to 6 parts by weight. Useful examples of the carbon black for this invention include HS-100 produced by Denka Co., #22B and #3500 by Mitsubishi Chemical Industries, Ltd., and the like.

The term 'specific surface area' means the surface area per unit weight, and is a physical amount quite different from the average particle size. For example, there exist particulate materials which are the same in the average particle size but differ in the specific surface area. The measurement of the specific surface area may be made by a magnetic powder material is first subjecting the magnetic powder to heat treatment at 250° C. for 30 to 60 minutes for deaeration to thereby remove adsorbates, and then conducting the powder into a measuring instrument with an initial nitrogen pressure therein of 0.5 kg/m$^2$. Adsorption of nitrogen takes place at the temperature of liquid nitrogen temperature (−195° C.) and is measured thus specific surface area measuring method is generally called 'B.E.T. Method' and is described more fully in J. Ame. Chem. Soc. 60 309 (1938)). For use in measuring the specific surface area (BET value), a powder-fluid measuring instrument 'Quanta sorb' jointly manufactured by Yuasa Battery Co. and Yuasa Ionics Co. is used. General explanation as to the specific surface area and its measuring method are set forth in detail in the 'Funtai no Sokutei' ('Measurement of Powder') by J. M. Dallavalle and Clydeorr Jr.; translated into Japanese by Benda et al; published by Sangyo Tosho Publishing Co., and also in the 'Kagaku Benran' ('Handbook of Chemistry'), Practical Application Sec., pp. 1170–1171, compiled by the Chemical Society, Japan and published on Apr. 30, 1966 by Maruzen Ltd. The above 'Kagaku Benran' uses the term 'surface area (m$^2$/gr)' in place of 'specific surface area', but it is clear that 'surface area' is identical in meaning to the term 'specific surface area' used in this specification.

Regarding the above-mentioned 'oil absorption (DBP method, DBP (dibutyl phthalate) is little by little added to 100 g of powdery pigment, and the condition of the pigment is observed while being kneaded. The ml value of the DBP when the pigment turns from the scattered dispersed state into lumps is regarded as the DBP oil absorption.

The magnetic recording medium, as shown in, for example, FIG. 1, has magnetic layer 2 on support 1. BC layer 3 is provided on the opposite side of the support from magnetic layer 2. The BC layer may or may not be provided. The magnetic powder, particularly the ferromagnetic powder, to be used in magnetic layer 2 is the above-mentioned iron-aluminum ferromagnetic metal powder having a Al content of from 0.5 to 20%. However, a small amount of non-aluminum metals such as Ni, Co, Mn, Zn, Cr, etc., may also be added to the layer. To magnetic layer 2 may also be added a lubricant (such as silicone oil, graphite, molybdenum disulfide, tungsten disulfide, a fatty acid ester comprised of a fatty acid having from 12 to 20 carbon atoms (e.g., stearic acid) and a monohydric alcohol having from 3 to 26 carbon atoms, or the like), an antistatic agent (such as graphite) and the like in addition to the carbon black. Further, there may also be added nonmagnetic abrasive particulate materials such as alumina ($\alpha$-Al$_2$O$_3$, also known as corundum; artificial corundum, fused alumina, silicon carbide, chromium oxide, diamond, artificial diamond, garnet, emery (principal constituents: corundum and magnetite), and the like. The amount of such the abrasive to be contained should be preferably not more than 20 parts by weight based on the magnetic powder, and the average particle size thereof should preferably be not more than 0.5 $\mu$m, and more preferably not more than 0.4 $\mu$m.

As a binder resin for the magnetic layer, polyurethane may be used. This may be synthesized by the reaction of polyol with polyisocyanate. If a phenoxy resin and/or a vinyl chloride-type copolymer also are contained in the polyurethane, they, when applied to the magnetic layer, not only improve the dispersibility of the magnetic powder, but also increase the mechanical strength of the magnetic layer. If the phenoxy resin and/or the vinyl chloride-type copolymer alone are used, the magnetic layer becomes excessively hard, but this can be prevented by incorporating polyurethane; the addition of polyurethane also improves the adherence of the magnetic layer to the support or subbing layer. Aside from the above-mentioned materials, any cellulose-type resins, thermoplastic resins, thermosetting resins, reactive-type resins, or electron-beam-setting resins may also be used as the binder resin.

The carbon black of this invention to be used in magnetic layer 2 may be added also to BC layer 3.

The magnetic recording medium of FIG. 1 may be one having a subbing layer (not shown) between magnetic layer 2 and support 1. Alternatively, the subbing layer may be omitted and/or the support may also be subjected to corona discharge treatment.

Examples of as the support are plastic materials such as polyethylene terephthalate, polypropylene, etc., metals such as Al, Zn, etc.; and glass, BN, Silicon carbide, porcelain, earthenware, and the like.

In forming the above-mentioned magnetic layer on the support, it is desirable to add in advance a given amount of a multifunctional isocyanate as a cross-linking agent to a coating liquid therefor, thereby hardening the magnetic layer. Further examples of the cross-linking agents are triphenyl-methane triisocyanate, tris-(p-isocyanate-phenyl) thiophosphite, polymethylene-polyphenyl isocyanate, and the like. Where the magnetic layer is to be hardened by electron-beam irradiation, the isocyanate compound may be omitted.

Figure 2:
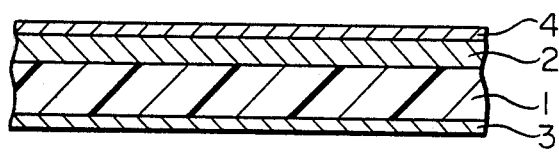

FIG. 2 is a drawing showing another example of the magnetic recording medium, wherein overcoat layer 4 is provided on magnetic layer 2 of the medium of FIG. 1. Overcoat layer 4 is provided for protecting magnetic layer 2 from any possible damage and, for this purpose, needs to have an adequately smooth surface. Upon this, as the binder resin for overcoat layer 4, urethane resin, preferably in combination with phenoxy resin and/or vinyl chloride-type copolymers used in magnetic layer 2 should be placed. The surface roughness of overcoat layer 4, particularly in connection with chroma S/N, should be of Ra≦0.01 μm and Rmax≦0.13 μm. In this instance, the surface roughness of support 1 is desired to be as smooth as Ra≦0.01 μm and Rmax≦0.13 μm.

Figure 3:
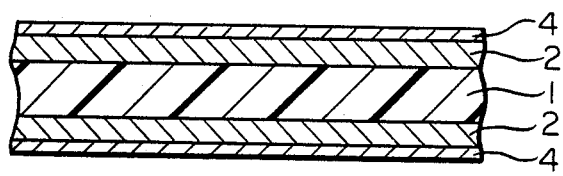

FIG. 3 is a drawing showing a magnetic recording medium constructed in the form of a magnetic disc, wherein magnetic layer 2 and overcoat layer 4 (similar to the above) are provided on both sides of support 1. Overcoat layer 4 may contain binder resins comprised principally of the foregoing polyurethane resins.

EXAMPLES

The present invention will be illustrated in detail by the following examples. The percentages and 'part(s)' used hereinafter are all by weight.' Samples 1 to 6 and Comparative Samples 1 to 8 were prepared:

Samples 1 to 5:

The following magnetic compositions were prepared by using iron-aluminum ferromagnetic metal powders having different Al contents; namely 0.5, 3.0, 5.0, 8.0 and 20.0% based on Fe and said metal powders also having different BET values; namely 53 48, 53, 50 and 43 m²/g, and carbon black HS-100, produced by Denka Co., having a BET value of 32 m²/g and a DBP oil absortion of 180 ml/100 g).

| | |
|---|---|
| Iron-aluminum ferromagnetic metal powder | 80 parts |
| Polyurethane resin (Nipporan 2304, produced by Nippon polyurethane Co.) | 5 parts |
| Phenoxy resin (PKHH, by Union Carbide) | 2 parts |
| Lecithin | 4 parts |
| α-Aluminum oxide (abrasive) | 4 parts |
| Carbon black (HS-100, by Denka Co.) | 3 parts |
| Cyclohexanone | 200 parts |
| Toluene | 30 parts |
| Methyl-ethyl ketone | 30 parts |

The constituents of the above compositions were thoroughly mixed by a ball mill, and added 3 parts of the multifunctional isocyanate (Coronate L, produced by Nippon Polyurethane Co.) as a binder hardener was added to the mixture, which was stirred again to be uniform, filtered and then coated on a polyethylene terephthalate film support so that the dry thickness was 3 μm. Thereafter the coated layer surface was supercalendered.

Subsequently, the following backcoat composition was prepared:

| | |
|---|---|
| Carbon black | 50 parts |
| Nitrocellulose (Cellunoba: produced by Asahi Chemical Industry Co.) | 20 parts |
| Polyurethane resin (Nipporan, by Nippon Polyurethane Co.) | 20 parts |
| Polyisocyanate (Coronate L, by Nippon Polyurethane Co.) | 10 parts |
| Methyl-ethyl ketone | 200 parts |
| Toluene | 200 parts |

The above composition was dispersed by ball milling for five hours, and was coated on the reverse side of the support having the above-coated magnetic layer so that the dry thickness is 0.5 μm, thereby forming thus prepared a backcoat layer was formed.

Each magnetic film web roll was then slit into 8-millimeter tape rolls, thereby preparing five different 8 mm video tapes as the samples of this invention, identified Samples 1 to 5. Each of the samples was loaded into a video tape cassette, and measured with respect to their various characteristics.

Sample 6:

A sample was prepared in the same manner as Sample 3 except carbon black HS-100 of Sample 3 was replaced by 3 parts by weight of carbon black #3500 (produced by Mitsubishi Chemical Industries, Ltd.) having a BET value of 45 m²/g, DBP oil absorption of 190 ml/100 g, whereby an 8 mm video tape sample was obtained, identified Sample 6.

Comparative Sample 1:

An 8 mm video tape sample was prepared in the same manner as in Samples 1 to 5 except that the iron-aluminum ferromagnetic metal powder was replaced by ferromagnetic metal powder containing no aluminum. The obtained 8 mm video tape was regarded as Comparative Sample 1.

Comparative Sample 2:

An 8 mm video tape sample was prepared in the same manner as in Samples 1 to 5 except that containing an iron-aluminum ferromagnetic metal powder having aqn Al content of 25% material was used in place of the alloy powder of Samples 1 to 5. The obtained 8 mm video tape obtained identified as Comparative Sample 2.

Comparative Sample 3:

An 8 mm video tape sample was prepared in the same manner as Sample 3 except that carbon black HS-100 was omitted, and the sample obtained was identified as Comparative Sample 3.

Comparative Sample 4:

An 8 mm video tape sample was prepared in the same manner as Sample 3 except that carbon black HS-100 of Sample 3 was replaced by 3 parts by weight of carbon black 'Starling V' (produced by Cabot) having a BET value of 35 m²/g and a DBP oil absorption of 91 ml/100 g. The 8 mm video tape obtained was identified Comparative Sample 4.

Comparative Sample 5:

An 8 mm video tape sample was prepared in the same manner as Sample 3 except that 3 parts by weight of carbon black V-9 (produced by Cabot Co.) having a BET value of 140 m²/g, and a DBP oil absorption of 114 ml/100 g was used in place of the carbon black HS-100. The 8 mm video tape obtained was identified as Comparative Sample 5.

Comparative Sample 6:

An 8 mm video tape sample was prepared in the same manner as Sample 3 except that 3 parts by weight of carbon black C-975 (by Columbian Carbon) having a BET value of 250 m²/g and a DBP oil absorption of 170 ml/100 g was used in place of carbon black HS-100. The video tape resulting therefrom was identified as Comparative Sample 6.

Comparative Sample 7:

An 8 mm video tape sample was prepared in the same manner as Sample 3 except that 3 parts by weight of carbon black HS-500 (by Asahi Carbon) having a BET value of 37 m²/g and a DBP oil absorption of 447 ml/100 g was used in place of the carbon black HS-100. This was identified as Comparative Sample 7.

Comparative Sample 8:

An 8 mm video tape sample was prepared in the same manner as in Sample 3 except that 3 parts by weight of carbon black R-MT-P (by Columbian Carbon) having a BET value of 8 m²/g and a DBP oil absorption of 36 ml/100 g was used in place of carbon black HS-100. This was identified as Comparative Sample 8.

These video tape samples were measured with respect to their characteristics, and the results obtained are given in FIG. 4. The evaluated items were ones measured according to the following criteria:

(a) Saturated magnetization: The saturated magnetization of each tape sample is indicated in gauss.

(b) Saturated magnetization after aging(in gauss): Each tape sample was allowed to stand over a period of one week at 60° C. and under 80% Relative Humidity (RH).

(c) Residual rate of saturated magnetization: The percentage which the Saturated Magnetization after aging bears to the Saturated Magnetization of each sample measured before being allowed to stand.

(d) Square ratio: The ratio of the residual magnetic flux density to the saturated magnetic flux density (without calender treatment) was measured by using Vibration Sample Magnetometer (VSM) at a measuring magnetic field of 5 kOe.

(e) Gloss: The gloss of each coated tape sample (without calender treatment) measured at an angle perpendicular to the coating direction using incident light at an angle of 60° to the vertical, and expressed in percent. Value of a reference plate regarded as 100%.

(f) Still mode endurance: The time (in minute) until the reproduction output of a still picture decreased by 2dB. The acceptable value of the still mode endurance is 120 minutes and over.

(g) Calendering stain: Stain on the metal roll of the calender after calendering 20,000 meters of each sample at 80° C. and a linear pressure of 200 kg/cm, the roll was examined by eye and the degree of stain that appeared on the roll was evaluated in accordance with the following criteria:
A: No stain.
B: Slight stain.
C: Conspicuous stain.

(h) Drop Out (5 μs): A 100% white level signal was recorded on each sample. The attenuation amount and duration of its video head-up output at the time of its playback were 12dB and 5 μs, respectively. Frequency of such the a period of 10 minutes, and the average frequency of drop-outs per minute was determined. The acceptable value of the drop-out is under 50 (5μs)

(i) Fall of RF output after durability; Playback of each recorded tape sample was repeated 200 times at normal temperature and normal humidity, and the differential between the initial RF output and the RF output after repeating the playback 200 times is indicated in dB. In the table, the '+' represents that the output after the 200-time playback is larger than the RF output in the initial playback.

(j) Shedding after durability test: After repeating the playback of each recorded sample 200 times at normal temperature and normal humidity, the stain on the tape-running section inside the video deck was wiped out, and the degree of the stain was judged visually in accordance with the following.
A: No stain.
B: Slight stain.
C: Conspicuous stain.

(k) Lack of Pulse Code Modulation (PCM) voice: PCM sound recording of a 1 KHz voice was made in the standard mode for 90 minutes using each tape sample; the tape was then played back. The number of voice-lacking times during the playback is given in the table.

(l) RF output: A VTR deck for RF output measuring use was used to measured the RF output at 4MHz, and the results obtained after repeating playback of the respective tapes 100 times are shown in relative values (in dB) relative to Sample 3 as the reference tape. The acceptable value of the RF output is at least −0.1 (dB).

(m) Lumi S/N: A measuring instrument "Noisemeter 925 D/1' manufactured by Shibasoku Co. was used to measure the lumi S/N of each sample. The results are given in the table in the differentials from Sample 3, which is regarded as 0 dB. The measurement took place with a high-pass filter at 4.2 MHz and a low-pass filter at 10 KHz. The VTR deck used is JVCHR-D 120. The acceptable value of the lumi S/N is at least −0.1 (dB).

(n) Chroma S/N: Similar to RF output. The acceptable value of the chroma S/N is at least −0.1 (dB).

(o) Coefficient of kinetic friction: The tape tensions at both inlet and outlet of the head cylinder were measured, and $$\mu K = \frac{1}{\pi} \ln \frac{T_2}{T_1} \frac{\text{(Outlet-side tension)}}{\text{(Inlet-side tension)}} \text{ was determined.}$$

The acceptable value of the coefficient of kinetic friction not more than 0.3.

From the results collectively given in the table in FIG. 4, it can be seen that the tapes according to the present invention exhibit excellent electromagnetic conversion and are satisfactory in respect of their other characteristics such as running endurance, calender stain, drop-out, coefficient of friction, and the like.

Figure 5:
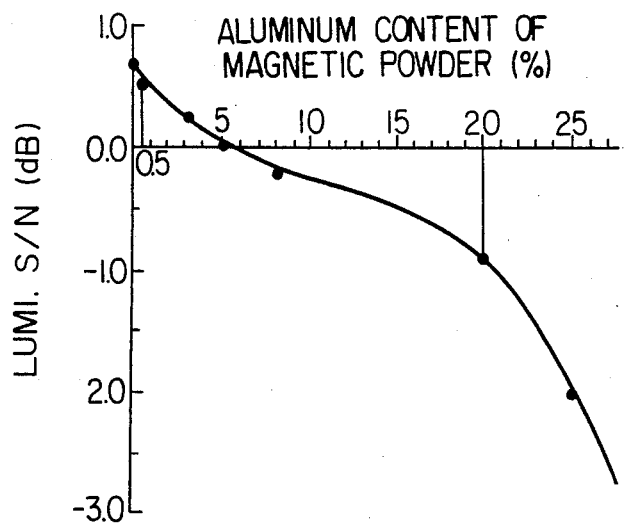
FIGS. 5 and 6 are graphs showing the characteristic changes resulting from variation of the Al content of the magnetic powder.
Figure 6:
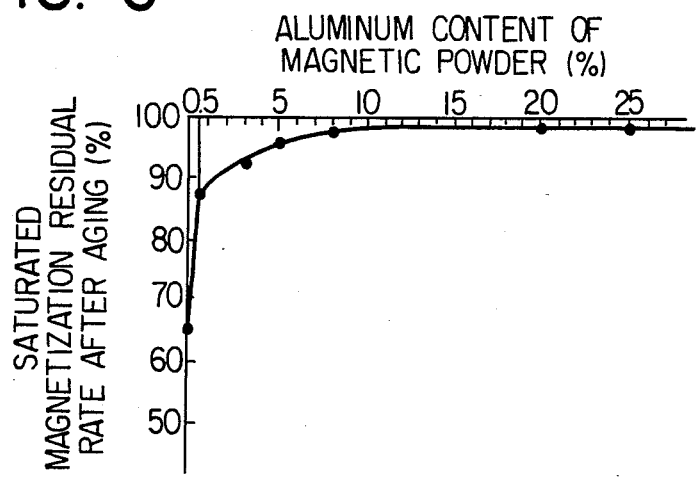

Subsequently, the relations between the aluminum content of the magnetic powder, the lumi S/N, and the residual rate of the saturated magnetization after aging were investigated. The results shown in FIGS. 5 and 6 were obtained. As is apparent from the two Figures, lumi S/N falls drastically from the point at which the aluminum content exceeds 20%; this tendency also applies to the RF output and chroma S/N. The residual rate of Saturated Magnetization after Aging deteriorats sharply where the aluminum content is less than 0.5%. Therefore, it is clear that the aluminum content of the iron-aluminum ferromagnetic metal powder should be from 0.5 to 20%.

Figure 7:
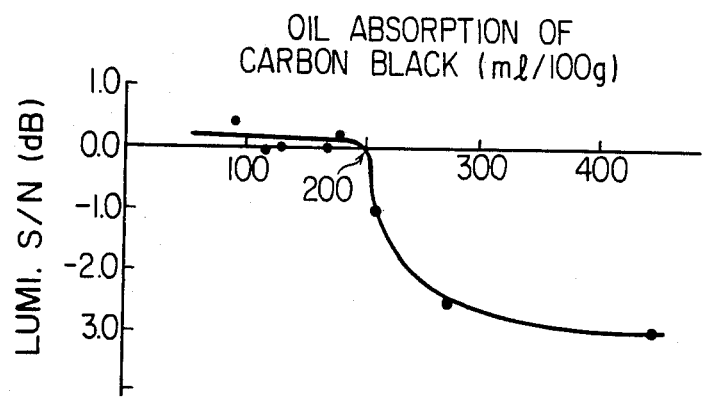
FIGS. 7, 8 and 9 are graphs showing the characteristic changes resulting from variation in the amount of carbon black.
Figure 8:
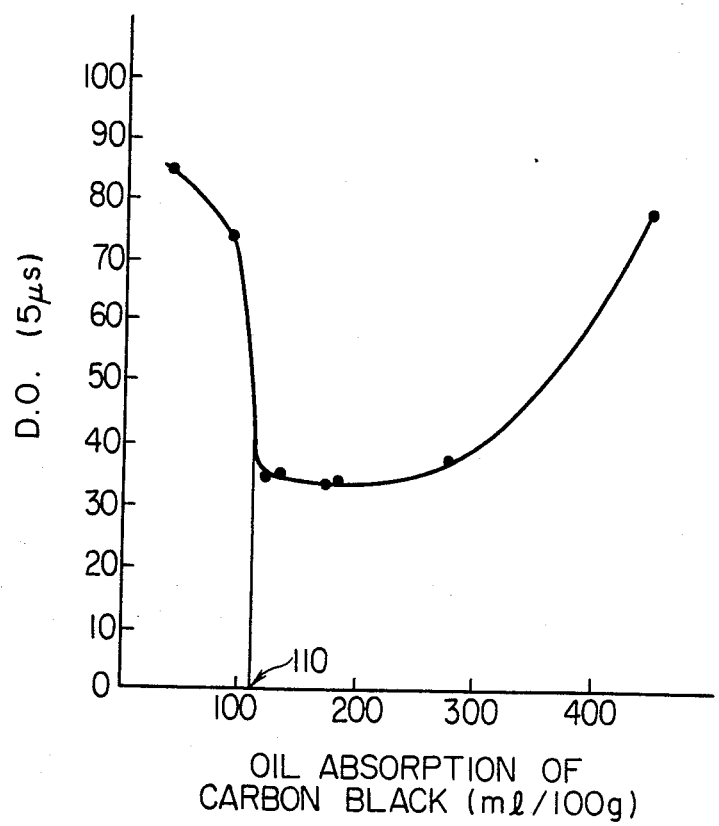

Next, the correlation between the oil absorption of the carbon black incorporated in Sample 1 and the characteristics of its tape is indicated in FIG. 7. This figure comprising a graph in which the lumi S/N is on the ordinate and the oil absorption of the carbon black is on the abscissa. It is apparent that the lumi S/N as well as the RF output and chroma S/N falls suddenly from the point where the oil absorption of the carbon black added exceeds 100 g. FIG. 8 shows the relation between the drop-out and the oil absorption of the carbon black. Where the oil absorption of the carbon black is less than 110 ml/100 g, the drop-out increases significantly.

As is seen from these results, the oil absorption of the carbon black should not be less than 110 ml/100 g nor more than 200 ml/100 g, taking into account the electromagnetic conversion and the drop-out.

Figure 9:
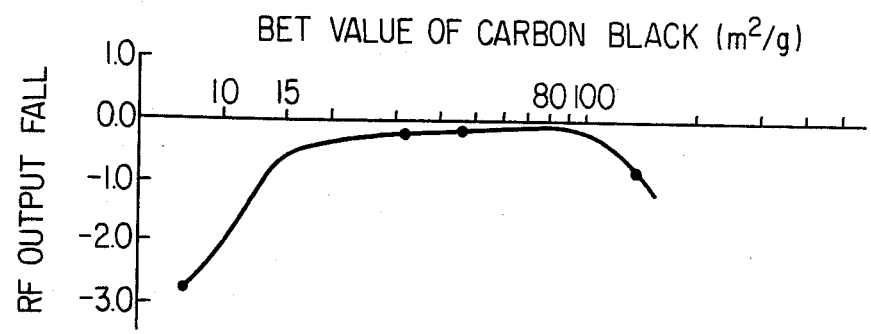

There is a correlation between the BET of the carbon black and the characteristics of the tape. A graph in which the fall of the RF output after running is plotted on the ordinate and the BET (log) is taken on the abscissa is shown in FIG. 9. From the graph, it can see that the satisfactory BET value range of the carbon black is from 15 m²/g to 80 m²/g.

What is claimed is:

1. A magnetic recording medium which comprises a magnetic layer and a support, said magnetic layer containing a magnetic powder comprising an iron-aluminum alloy wherein the aluminum content of said magnetic powder is from 0.5 to 20% by weight and a carbon black, wherein the BET specific surface area of the carbon black is from 15 to 80 m²/g and the DBP oil absorption of the carbon black is from 110 to 200 ml/100 g.

2. The medium of claim 1 wherein said magnetic layer further contains a binder.

3. The medium of claim 2 wherein said binder is polyurethane.

4. The medium of claim 2 wherein said binder comprises a phenoxy resin and/or a vinyl chloride copolymer.

5. The medium of claim 1 wherein the content of the carbon black in the magnetic layer is not more than 10 parts per 100 parts by weight of the magnetic powder.

6. The medium of claim 5 wherein the content of the carbon black is from 0.1 to 6 parts per 100 parts by weight of the magnetic powder.

7. The medium of claim 1 wherein the aluminum content of the magnetic powder is from 1 to 8% by weight.

8. The medium of claim 1 wherein the BET specific surface area of the carbon black is from 20 to 50 m²/g.

9. The medium of claim 1 wherein the DBP oil absorption of the carbon black is from 160 to 200 ml/g.

10. The medium of claim 1 wherein said magnetic layer further contains an abrasive material.

11. The medium of claim 10 wherein the content of the abrasive material is not more than 20 parts per 100 parts by weight of the magentic powder.

* * * * *